United States Patent [19]

Bigner

[11] Patent Number: 4,895,881

[45] Date of Patent: Jan. 23, 1990

[54] COATING COMPOSITION

[75] Inventor: Christian Bigner, Lidingö, Sweden

[73] Assignee: Extensor AB, Angered, Sweden

[21] Appl. No.: 52,532

[22] Filed: May 20, 1987

Related U.S. Application Data

[63] Continuation of Ser. No. 701,132, Feb. 13, 1985, abandoned, which is a continuation of Ser. No. 515,307, Aug. 18, 1983, abandoned, which is a continuation of Ser. No. 413,476, Aug. 31, 1982, abandoned, which is a continuation of Ser. No. 249,631, Mar. 31, 1981, abandoned, which is a continuation-in-part of Ser. No. 96,551, Nov. 21, 1979, abandoned, which is a continuation of Ser. No. 964,069, Nov. 27, 1978, which is a continuation of Ser. No. 854,742, Nov. 25, 1977.

[30] Foreign Application Priority Data

Nov. 25, 1976 [SE] Sweden ............................ 7613245-5

[51] Int. Cl.$^4$ .................................................. C08J 7/04
[52] U.S. Cl. ..................................... 523/122; 523/177
[58] Field of Search ................ 523/122, 177, 122; 526/242

[56] References Cited

U.S. PATENT DOCUMENTS

| | | | |
|---|---|---|---|
| 3,265,124 | 8/1966 | Reys | 428/408 |
| 3,684,752 | 8/1972 | Goto et al. | 514/493 |
| 3,898,190 | 8/1975 | Willey | 523/177 |
| 3,962,171 | 6/1976 | Robbins | 524/463 |
| 4,010,141 | 3/1977 | Onozuka et al. | 523/177 |

FOREIGN PATENT DOCUMENTS 2050794 6/1969 France .
54-26827 2/1979 Japan .

OTHER PUBLICATION

Dupont Magazine: *A Winning Difference*, February, 1972, pp. 13–15

*Primary Examiner*—Joseph L. Schofer
*Assistant Examiner*—Alex H. Walker
*Attorney, Agent, or Firm*—Abelman Frayne Rezac & Schwab

[57] ABSTRACT

An antifouling coating composition for boat hulls, etc. based on a combination of fluoro-carbon polymers especially polytetrafluoroethylene and antifouling agent, especially copper metal and $Cu_2O$, as active constituents. Additional binders and fillers can be included.

9 Claims, No Drawings

COATING COMPOSITION

This is a continuation Application of Ser. No. 701,132, filed Feb. 13, 1985, now abandoned, which is a Continuation Application of Ser. No. 515,307 filed Aug. 18, 1983, now abandoned, which is a Continuation Application of Ser. No. 413,476 filed Aug. 31, 1982, now abandoned, which is a Continuation Application of Ser. No. 249,631 filed Mar. 31, 1981, now abandoned, which is a Continuation-In-Part Application of Ser. No. 096,551 filed Nov. 21, 1979, now abandoned which is a Continuation Application of Ser. No. 964,069 filed Nov. 27, 1978, which is a Continuation Application of Ser. No. 854,742 filed Nov. 25, 1977.

The invention is question concerns a composition, which is suitable for use as ship bottom paint and for similar purposes, to prevent adherence of water organisms (fouling) on a surface in fresh or salt water.

The composition of the coating according to the invention consists of a combination of fluorocarbon polymers and so-called "growth-hindering" agents or "anti-fouling" agents, by which is meant agents which when included in a coating prevent or retard the adherence to and growth on said coating of organisms which live in water, e.g. bacterial or diatome slimes, algae, barnacles, mussels, tube or ship worms, moss, teredos, limnoria, martesia, sphaeroma, oysters, bryozoans, etc. According to the invention these agents are included into the coating in a quantity which is sufficient to prevent or counteract adherence and growth of said and other organisms in an aqueous environment, such as lakes, streams and seawater and also e.g. in pipe systems and in apparatuses and devices used in the industry, e.g. heat exchangers, cooling towers, etc.

As a fluorocarbon polymer one can use a number of fluorocontaining polymers, as for instance polytetrafluoroethylene, tetrafluoroethylene-perfluoropropylene, polyvinylidene fluoride and ethylene-tetrafluoroethylene copolymers and similar materials, which contain fluorine bonded to a carbon chain.

The fluoro polymers can be in form of fine particles, for instance with a particle size less than 20 microns and often with a particle size below 10 or 15 microns. The majority of the particles or all the particles often have a particle size exceeding approximatley 0.1 or 1 micron. A normal particle size is approximately 5 microns as an average.

The shape of the particles may be essentially spherical, blocky, flaky, or fibrous with the diameter size stated above. The density of polytetrafluoroethylene may be 2.14–2.20, preferably approximately 2.16. The melting point (crystal) suitably is 280–330° C., particularly approximately 300° C. The average molecular weight may vary within a wide range, for instance 1,000–20,000 or 2,000–5,000, preferably approximately 3,700.

The softening point (ASTM E-28-58-T) may vary, for instance between 240 and 280° C., for instance approximately 265° C.

Fluorocarbon polymers in the trade often are offered as a dispersion in suitable dispersion media, for instance chlorinated or fluorinated hydrocarbons, for instance fluorinated hydrocarbons that in the trade are offered under the product name of "FREON". One example is trichlorotrifluoroethane.

It is also in some cases advisable that the solvent or the dispersion media has a certain dissolving effect on the fluorocarbon polymers, for instance by dissolving it up to 25%, or 1–15%, preferably approximately 10%. Also lower degrees of solubility, for instance 0.1–1% can have certain effects. Said dissolving effect may be partial so that the polymer is only swelled or forms a type of colloide.

The growth hindering (anti-fouling) components in the composition according to the invention can be selected among a great number of substances that have proven suitable to counteract growth of organisms on surfaces and surface coatings submerged in sea and other waters, such substances are described in a number of publications, e.g. the American patent publications 3,787,217, 3,854,960 and 3,912,519. What is disclosed in these patent publications is intended to form a part of the present description and is included by reference. As an example one can particularly mention metallic copper in powder form as well as coppe oxide, for instance $Cu_2O$, as well as copper salts, arsenic salts, mercury compounds and chlorinated hydrocarbons, for instance hexachlorocyklohexane and also tin compounds, particularly triorganotin compounds, for instance tributyl- and triphenyl tin compounds and tributyl tin oxide. Together with these growth-hindering components such additives as colloidal silica dioxide gel can be used, for instance the type that is produced by flame hydrolysis of silicon compounds.

The amount of anti-growth (anti-fouling) compounds may be varied within a very wide range. Measured on the weight of the dry coating the composition may contain up to 90–95% anti-growth compound suitably up to 50% and particularly up to 25%. Also lower amounts, for instance up to 5 or 10%, are suitable for certain types. The lowest effective amount varies depending on the type of compound and may for instance range between 5 and 10%. Even lower amounts, for instance down to 1 or 0.1%, are suitable.

The amount of fluorocarbon polymers varies as well within broad limits depending on the amount of anti-fouling compounds and other substances, for instance binders. Measured on the weight of the dry coating the fluorocarbon polymer weight may be up to 90–95%, preferably utp to 50% and in many cases up to 25%. Also amounts up to 5–10% are usable. The lower range varies as well depending on the other ingredients and on the demands. A lower range between 10 and 25% is often preferable but even lower amounts are usable, for instance down to 5% and even down to 1%.

Besides fluorocarbon polymers and the amounts of the anti-fouling additives the coating composition may contain, for instance additional amounts of binders are for instance epoxy resins and other binders of a thermoplastic or of a curable type, which are suitable in combination with fluorocarbon polyers. A number of such materials are described in the literature,for instance in the Swedish patent publication 219.806, and the disclosure of said patent publication is included by reference as a part of the present specification. As examples such curable and non-curable plastics as phenolic resins, urea=formaldehyde plastics, alkyd plastics, epoxy plastics, polyurethane plastics and alkyl silicone plastics and silicones may be mentioned.

It is also possible to apply the composition according to the invention on a surface that has been prepared or pretreated in some well-known manner, for instance with conversion coatings such as phosphate treatments, chromate treatments, oxalate treatments and similar, as well as prepared with prior coatings of paint type products that containb inder compositions. A number of such pretreatment compounds or paint type compositions are well-known, e.g. primers.

In addition to the mentioned ingredient compositions according to the invention also preferably comprise solvents which after application of the composition on a surface can be removed by evaporation or dissolving. Examples of solvents are halogenated hydrocarbons, such as alkane and alkylene hydrocarbons, e.g. chlorinated and/or fluorinated hydrocarbons, e.g. methylene chloride, trichlorethane, trichlorethylene and "FREON"-hydrocarbons for instance hydrocarbons with 1, 2, 3 or 4 carbon atoms in the chain with at least 25, 50, 75 or 100% of the hydrogen atoms substituted with fluorine and optionally chlorine, especially trifluorotrichlorethane. Also aromatic hydrocarbons of solvent type may be used. Furthermore, solvent blends containing the mentioned types of solvent may be used, such as trichlorotrifluorethane (e.g. above 50%) plus one or more of tuluene, n-heptane and particularly trichlorethane.

The amount of solvent/disperson media,measured on the total weight, often is up to 95%, preferably up to 75 or 50%, in certain cases up to 25%,but preferably at least 10%, especially at least 20%, partoicularly at least 40%. As solvents or disperson medias for the compositions also other polar or non-polar liquids, for instance hydrocarbons, alcohols, ketones, with 2-8 carbon atoms, as well as water may be used, and the ingredients of the composition can be dispersed separately in water or be blended into a dispersion or solution in a water-soluble or non-soluble liquid, which is dispersed in water.

The thickness of the applied coating may vary. Usually, a coating thickness less than 50 microns may be used, particularly less than 25 microns, for instance less than 10 or 5 microns. A normal lower thickness range is 1-5 microns and a preferred thickness range is between 5-15 microns. The amount of anti-fouling compounds, for instance copper powder or copper oxide, may correspondingly vary for instance up to 50 g/m$^2$, particularly up to 25% g/m$^2$, for instance up to 10 or 15 g/m$^2$. A suitable lower rnage is often between 1 and 5 g/m$^2$ but even lower amounts, for instance 0.1 g/m$^2$ can be used. An amount of approximately 25-75%, preferably approximately 50% of the binder weight is often suitable, for instance for copper powder, $Cu_2O$ and similar.

As an example of a suitable pigment with particular characteristics pigments with layer lattice structure can be mentioned, for instance molybdenum disulfide, $MoS_2$ and graphite. A suitable amount of these substances is from 0.1 up to 5 or 10% $MoS_2$ which together with polyfluorocarbons gives a special effect and contributes also to reducing the friction as well as increasing the speed. Graphite can also be used as a substitute for or in combination with $MoS_2$.

Compositions according to the invention may be distributed in different manners, such as a 1-component composition but also as multi-component compositions. A suitable type is a 2-component composition comprising a fluid component containing fluorocarbon polymers dispersed in solvents optionally together with binders, and a pigment component containing anti-fouling compound or compounds optionally together with other additives and optionally dispersion media. Preferably the pigment component is a solid powder and is mixed with the liquid component prior to use. Suitable is for instance a liquid component containing as main ingredients a fluorocarbon polymer dispersion and solvent, preferably approximately 20% of a fluorocarbon polymer, e.g. of the same type as "TEFLON" (polytetra-fluoroethylene) for instance with a fluorocarbon polymer content of approximately 20-80% and as balance a liquid dispersion media, for instance of the "FREON"-type plus approximately 80% additional solvents, for instance trichloroethylene or similar (for instance "CHLORTHENE NU" ®, which is sold by Dow Chemicals. The liquid component may furthermore contain binders of other types, for instance those mentioned above. The pigment constituent can e.g. comprise copper powder in an amount of 50-90% and molybdenum disulfide in an amount of 10-15%, for instance approximately 70% copper powder and 25% molybdenum disulfide. The weight ratio of the liquid component to the pigment component can be approximately 25-200 g pigment per 800-975 g of the liqud component with a total weight of 1000 g. A suitable proportion is approximately 875 g liquid component and approximately 125 g pigment with the previously mentioned composition of fluids, fluorocarbon polymer containing component and pigment component.

A ususal size of the copper powder is approximately 300 to 30 mesh, for instance 50% "fine" and 50% "superfine", e.g. from 0.02-0.04 mm to 0.5-mm particle size. Preferably flaky particles are used with a ratio thickness/diameter of 1/10 to 1/100, preferably 1/20-b 1/50, at least 50% and preferably at least 80% of the particles having a diameter below 10 microns.

The coatings may be applied in different manners, for instance with a paint brush, a roller, by spraying, dipping, flow coating.

The coatings may even be melted (sintered) on the substrate through heating, for polytetra-fluoroethylene, for instance over 280° C., such as 300-315° C., during 1-20 minutes,for instance 5-10 minutes, or flame sprayed.

Compositions according to the invention may be applied on various substrates, for instance steel, zinc, aluminum, stainless steel, plastic, concrete, stone(silicate) glass, porcelain, artificial stone, brick, wood, with or without precoatings of paint, lacquer, phosphate or chromate conversion coatings, etc.

The compositions can also contain etching components such as phosphoric acid and other acid or alkaline components, which attack the substrate and improve the adhesion. These components can be of the "Wash-primer" type and can also include for instance zinc chromate or other chromates and polyvinyl butyral and similar constituents known from Wash-primers. Other usable constituents, e.g. in compositions containing water as a dispersing or emulsifying vehicle, are thermoplastic constituents such as acrylic monomers copolymerized with other unsaturated monomers, polyvinyl acetate, polystyrene, vinylchloride-vinylidene chloride copolymers other vinyl polymers, styrene-butadiene copolymers, chlorinated rubber, colophonium-resinates, linear polyesters such as polyethylene terephtalate, polybutylene terephtalate, polyisobutylene, rosine and similar.

As further examples of pigments and fillers rust- and corrosion-protective additives such as red lead, zinc chromate, metallic zinc, metallic aluminum powder. metallic aluminum bronze powder and similar can be used.

As further examples of growth preventing (anti-fouling) additives, particularly effective against balonides.

for instance barnacles, mussels, tubifex and similar, mixtures of $Cu_2O$ and $HgO$ can be used.

Further examples of fluorocarbon polymers that can be used are polytrifluorochloroethylene, polyfluoroethylene propylene, polyvinylfluoride, polyvinylidene fluoride, fluorinated rubber, e.g. products made by vulcanizing polychlorotrifluoroethylene and/or vinylidene fluoridehexafluoropropylene copolymers with polyfunctional amines or peroxides, and fluorinated silicon rubber, especially peroxide-vulcanized.

Silicones (silicon organic compounds) which are used according to the invention may be of the oil-type or resin-type and may be curable or non-curable (thermoplastic) linear or tridimensionally linked. Silicones are discussed thoroughly e.g. in a book by W. Noll: "Chemie und Technologie der Silicon", second addition, Verlag Chemie, Weinheim, BRP, 1968 (the disclosure of which is included by reference), and in "Chemie und Technologie der Kunststoffe", volume II, Akademische Verlagsgesellschaft Geest & Portig K-G, Leipzig, 1963, pages 789-858 (the disclosure of which is included by reference), and in "Silicone Technology", editor: Paul F. Bruins (Applied Polymer Symposia no. 14), Interscience Publishers, John Wiley & Sons, New York (the disclosure of which is included by reference). Also suitable silanes, preferably those which can form silicone polymers or siloxanes (polysiloxanes) may be included in compositions according to the invention.

The molecular weight of the silicon organic compounds used according to the invention may vary within broad limits, e.g. between 20 and 100000, e.g. 100 to 10000.

The content of silicon organic compound (including polymers) may vary, based on the solids weight (dry weight) from zero up to 5%, preferably from 0,01%, especially 0,1% and particularly 0.3% up to 3%, especially up to 1%.

The silicon organic compounds may also partly substitute the fluorocarbon (fluorohydrocarbon) polymers in compositions according to the invention. The silicon organic compounds used for said purpose may consist of the silanes, siloxanes, silicones resp. linear or three-dimensionally linked polymers of said compounds mentioned above.

Further fluorocarbon polymers which can be used according to the invention and which may or may not contain hydrogen, chlorine, nitrogen or other atoms or groups in the repeating groups or included in other ways in the molecule, are disclosed in the book "Fluoropolymers, Leo A. Wall, Wiley-Interscience (High Polymers Vol. XXV, Library of Congress Catalog Card Number: 74-165023) (the disclosure of which is included by reference). As examples of antifouling agents the following may be mentioned:

Organic and inorganic compounds of one or more elements belonging to the following groups of the periodical system: 2a (Be, Mg, Ca, Sr, Ba), 3b (Sc, Y, La, Ce, Th), 4b (Ti, Zr, Hr), 5b (V, Nb, Ta, U), 6b (Cr, Mo, W), 7b (Mn, Tc, Re), 8 (Fe, Ni, Co), 1b (Cu, Ag, Au), 2b (Zn, Cd, Hg), 3a (B, Al, Ga, In, Tl), 4a (C, Si, Ge, Sn, Pb), 5a (P, As, Sb, Bi), 6a (S, Se, Te), 7a (F, Cl, Br, J), as well as the other lanthanides, and also the elements stated above in elemental state.

Examples are organic and inorganic heavy metal compounds, such as zinc oxide, zinc thiocarbamate, zinc carbonate, zinc metal, lead metal, lead acetate, phenolic lead compounds (phenyl-lead compounds), phenols and phenolic compounds (phenyl compounds), such as phenyl-metal compounds, e.g. phenyl-heavy metal compounds, phenyl-urea compounds, e.g. according to the Swedish patent No. 7106810-0 (the disclosure of which is included by reference), triazine derivates, e.g. combined with heavy metal compounds, e.g. tin, zinc, lead, copper compounds, triphenylarsazine chloride, chinoxaline derivate, chlorinated hydrocarbons, e.g. DDT, pentachlor phenol, tri-n-butylfluoride, naphthenates, e.g. Cu, Zn, Fe naphthenates, formaldehyde, paraformaldehyde.

Further examples of antifouling agents are disclosed in the U.S. Pat. Nos. 3,676,388, 3,266,913, 3,885,039, 3,100,718, 3,100,719, 3,794,501 and the Swedish patent publications Nos. 334,613, 140,806, 213,824, 353,343, 381,275, 7206111-2, 370,082, and the disclosure of all said patents and patent publications are included by reference.

Further examples of antifouling agents which can be used in antifouling compositions according to this invention are:

Cuprous oxide, copper powder, mercury oxide, cuprous oxide-mercury oxide (e.g. in the ratio 3:1), mercurous chloride, organic tin compounds, e.g. triphenyl tin chloride, triphenyl tin bromide, tri-p-cresyl tin chloride, triethyl tin chloride, tributyl tin chloride, phenyldiethyl tin fluoride, tri-(p-chlorophenyl tin) chloride, tri-(m-chlorophenyl tin) chloride, dibutylethyl tin chloride, dibutyloctyl tin bromide, tricyclohexyl tin chloride, triethyl tin stearate, tributyl tin stearate, triethyl tin fluoride, tributyl tin fluoride, diphenyl tin chloride, diphenylethyl tin fluoride, triphenyl tin hydroxide, triphenyl tin tiocyanate, triphenyl tin trichloroacetate, tributyl tin acetate, tributyl tin decanate, tributyl tin neopenthanate, trioctyl tin decanate, tributyl tin oxide, trioctyl tin oxide, triphenyl tin fluoride, tributyl tin oleate, tripropyl tin neodecanate, tributyl tin laurate, tributyl tin octanoate, tributyl tin dimethylcarbamate, tributyl tin resinate, tributyl tin chromate, amyldiethyl tin decanate, tributyl tin naphthenate, tributyl tin isooctylmercapto acetate, bis(tributyl tin) oxalate, bis(tributyl tin) malonate, bis(tributyl tin) adipate, bis(tributyl tin) carbonate, organic lead compounds, e.g. triphenyl lead acetate, triphenyl lead stearate, triphenyl lead neodecanate, triphenyl lead oleate, triphenyl lead chloride, triphenyl lead laurate, triethyl lead oleate, triethyl lead acetate, triethyl lead stearate, trimethyl lead stearate, triphenyl lead bromide, triphenyl lead fluoride, organic compounds, such as 10,10'-oxybisphenoxazine (SA-546), 1,2,3-trichloro-4,6-dinitrobenzene, hexachlorophene, dichlorodiphenyl trichloroethane, phenolmercury acetate, tetrachloroisophthalonitrile, bis(n-propylsulphonyl) ethylene, N-dimethyl-N'-phenyl-(N'-fluorodichloromethylthio) sulphamide, etc.

In the coating composition or in the coating filler particles may be included, e.g. particles which improve the resistance or strength of the coating. Particles of inorganic or organic materials can be used, such as molten or sintered water resistant materials, e.g. glass, ceramic materials, metals, etc. The shape of the particles may be regular, e.g. spherical, such as glass beads, plastic beads, or irregular, such as flaky, fibrous, blocky, shape obtained by crushing etc. The filler particles may also comprise the antifouling agent and/or carbon fluoropolymer included or bonded to the surface of the filler particles. The filler may also consist of a pigment material.

When using beads of glass or resin, e.g. vinylic or acrylic resin or an elastomeric material such as rubber a diamter of about 1–100 microns, preferably 5–50 microns or 5–30 microns may be suitable. The beads can be included for improving the friction characteristics of the coating in water.

EXAMPLE

A coating composition with the following constituents was prepared:
100 grams polytetrafluoroethylene average molecular weight about 5000
100 grams copper powder, flaky, 80 % below 10 microns in diameter
30 grams molybdenum disulphide
the polytetrafluoroethylene was dispersded in 770 grams of a mixture of 200 grams trifluorotrichloroethane and 570 grams thichloroethane and the other constituents were then dispersed in said dispersion. This composition was applied to a film thickness of about 5–10 microns on ship bottoms of plastics, aluminum and steel with and without undercoatings of paint and gave a good long time effect against fouling in sea-water.

The bonding of said coating to the substrate can also be improved in a per se well-known manner, e.g. with a primer coating, e.g. of the types mentioned above, such as an epoxy primer, the antifouling composition coating being applied when the primer coating still gives a bonding effect to the antifouling coating. Further experiments were performed in which the antifouling composition stated above was coated on a primer coating consisting of amide cured epoxy resin obtained by mixing Epon 1001 (Shell) and Versamide (General Mills), said primer coating being coated on substrates consisting of iron, aluminum, zinc, bronze and plastics (polyester), and the bonding and antifouling effect was good. The bonding of the antifouling composition to the substrate can also be improved by including per se well-known binders, such as those stated above. In further experiments the amide cured epoxy resin stated above was included in a quantity of 30 resp. 60 grams of the mixture of Epon 1001 and Versamide in the quantity of coating composition stated in the example above. Also this composition was tested on substrates consisting of iron, aluminum, zinc, bronze and plastics (polyester) with good effects.

In further experiments the coating was heated for sintering to substrates of iron, aluminum, bronze and zinc.

Essentially the same coating film thickness of about 5–10 microns in the dried state was used in all the examples stated above.

Further examples were conducted by adding 10% of glass beads with an average diameter of 5 microns resp. 30 microns in the coating composition.

The experiments stated above were repeated with $Cu_2O$ substituted for half of resp. the entire copper metal constituent. Satisfactory results were obtained in all cases.

The antifouling composition according to the invention can also be applied as an antifouling layer at the surface of a moulded article, especially a moulded boat bottom, by coating the composition on the surface of the mould used for forming said moulded article, optionally on a release layer applied on said mould surface. The article is thereafter moulded in said mould so that the layer of the antifouling composition forms a part of the moulded article and is completely or partly released from the mould together with the moulded article. The material used for forming the moulded article in the mould or on the moulding surface coated with the antifouling composition may consist e.g. of inorganic or organic moulding materials, such as an organic polymer material, such as curable or thermoplastic resins, curable proper materials, etc. Said moulding materials may also comprise various additives, especially reinforcing materials and poarticularly fibrous reinforcing materials, such as glass fibres, ceramic fibres, especiallydevitrified fibres, carbon fibres, boron fibres, or other inorganic fibres, organic fibres, espeically polymeric resin fibres, such as polyester fibres, etc., or combinations thereof. Other moulding materials which may optinally be used together with the reinforcing materials stated above are inorganic hydraulic binders, optionally together with various fillers, such as Portland cement, and also combinations of such inorganic binders and organic resinous materials of curable or thermoplastic type, preferably together with fillers. Preferred moulding materials are polymeric or resinous materials (plastics) of thermoplastic or curable type, especially curable resins used for moulding reinforced article, the reinforcing material preferably consisting of inorganic fibres, such as glass fibres, ceramic fibres, high-strength carbon fibres, graphite fibres, boron fibres, etc., organic fibres, such as polyamide fibres or nylon fibres, polyester fibres, e.g. polyethylene terephthalate fibres, e.g. terylene, dacron, etc. common curable resinous materials are polyesters, especially of those types used for producing e.g. boards, especially with reinforcing glass fibres, carbon fibres, etc.

Especially when moulding a resinous material the layer of antifouling composition of the moulding surface is preferably coated with a layer of so-called gelcoat comprising e.g. a curable material based on styrene or styrene derivatives, especially styrene monomer, optionally with fillers. Said gel-coat layer may consist of the same materials which are usually used as surface layers when producing moulded boats from resinous materials, especially fibre-glass reinforced polyesters, etc., and may be applied with essentially the same thickness as is normally used for said purpose. On said gelcoat layer the remaining moulding material is then applied to form the desired moulded article, especially a fibre-reinforced boat bottom.

The moulded material applied directly on the layer of the antifouling composition may comprise constituents which improve the adherence to the antifouling composition or form an integral bond to said coating, such as the halogenated hydrocarbons mentioned as suitable dispersions for the fluorine-containing polymer particles of the antifouling composition.

The antifouling composition may be applied as one, two, three or more layers on the moulding surface, especially with a layer thickness within the ranges stated above. The antifouling composition may be applied by brushing, rolling, spraying, etc.

The antifouling composition may be applied directly onto the moulding surface or on a release layer on said moulding surface. Said release layer may consist of the antifouling composition itself. Other release agents are fluorine-containing hydrocarbon polymers, silicone resins, etc. Furthermore, it is possible to apply on one or more layers of the antifouling composition one or more layers of the antifouling composition mixed with the material to be moulded and especially with gel-coat in order to obtain a gradual transition from antifouling composition to moulding material.

Example of moulding the antifouling composition into a boat bottom.

The antifouling composition disclosed in the preceding Example was coated onto the shaping surface of a mould for forming a boat bottom by rolling and by spraying one, two three and a plurality of layers of the composition to a total thickness, on a dry material basis of from 5 to 100 microns. After drying gelcoat comprising styrene monomer as curable resin component was coated onto the antifouling composition layer and thereafter a fiberglass reinforced curable resin boat bottom was moulded by a conventional method in said mould. Excellent integrity between the antifouling composition layer and the rest of the boat bottom material was obtained and the moulded boat bottom could be released without difficulty from the mould. Similar results were obtained with 50 % and 100% of the copper metal flakes substituted with $Cu_2O$ and also with a layer of antifouling composition mixed with gelcoat applied on top ofthe antifouling composition prior to the gelcoat coating. Further experiments were performed with gelcoat comprising from 1 to 50% by volume of copper powder with good results. Further experiments were also performed in which high strength carbon fibres were used as reinforcement in the curable resin composition applied onto the intermediate gelcoat layer. Similar results were obtained.

I claim:

1. An anti-fouling composition for coating on a surface intended to be submerged in water comprising a binder, form 1 to 50% of polytetrafluoroethylene particles, based on the dry weight of the composition, and from 5 to 95%, based on the dry weight of the composition, of an antifouling agent selected from the group consisting of copper metal and copper and zinc compounds, and also comprising a liquid dispersion medium, including at least one halogenated hydrocarbon, the polytetrafluoroethylene particles being dispersed in said liquid dispersion medium.

2. The composition according to claim 1 wherein the binder is selected from the group consisting of epoxy resins, acrylic resins, silicon organic compounds, vinyl polymers, styrene polymers, chlorinated rubber, resinates, polyesters, polyisobutylene, phenolic resins, urea-formaldehyde resins, polyurethane resins and mixtures thereof.

3. The composition according to claim 1 further including a pigment selected from the group consisting of molybdenum disulphide and graphite.

4. The composition according to claim 1 wherein said antifouling agent is selected from the group consisting of $Cu_2O$ and copper metal.

5. An antifouling composition in the form of a coating on a substrate under water, said substrate being subject to fouling with organisms which live in water, said composition being in direct contact with the water and imparting antifouling characteristics to said substrate and comprising a binder, from 1 to 50% of polytetrafluoroethylene particles, based on the dry weight of the composition, and from 5 to 95%, based on the dry weight of the composition, of an antifouling agent selected from the group consisting of copper metal and copper and zinc compounds.

6. The antifouling composition of claim 5 which consists of an antifouling layer on a moulded boat bottom, said layer being moulded as an outermost layer into said boat bottom.

7. A composition according to claim 1 wherein the composition comprises two components, the first component containing the polytetrafluoroethylene particles in a liquid dispersing agent, and the second component containing an antifouling agent for mixing with the first component prior to use.

8. The antifouling composition according to claim 1 in which said halogenated hydrocarbon is selected from the group consisting of fluorinated, chlorinated and fluorinated-chlorinated hydrocarbons with 1-4 carbon atoms.

9. The antifouling composition according to claim 8 in which said liquid dispersion medium also includes a liquid selected from the group consisting of armoatic hydrocarbons, alcohols, ketones and water.

* * * * *